Nov. 23, 1954 — R. T. HAMEL — 2,695,193
DUAL PURPOSE SUN VISOR
Filed Oct. 9, 1950 — 2 Sheets-Sheet 1

RICHARD T. HAMEL, INVENTOR.

BY Lyon & Lyon

ATTORNEYS

Nov. 23, 1954

R. T. HAMEL 2,695,193

DUAL PURPOSE SUN VISOR

Filed Oct. 9, 1950

2 Sheets-Sheet 2

RICHARD T. HAMEL,
INVENTOR.

BY

ATTORNEYS

United States Patent Office 2,695,193
Patented Nov. 23, 1954

2,695,193

DUAL PURPOSE SUN VISOR

Richard T. Hamel, Beverly Hills, Calif.

Application October 9, 1950, Serial No. 189,274

4 Claims. (Cl. 296—97)

The present invention relates to improved sun visors or shields, and in general to improved structures of the type shown in my previous United States Letters Patent, patented August 8, 1950, Patent No. 2,517,872.

The present invention contemplates the use of two sun visors and their mountings for use in automobiles for purposes of accomplishing results not heretofore achieved with prior art visors.

An object of the present invention is to provide an improved and simplified universally adjustable visor construction which may be used in connection with the conventional sun visor presently supplied as stock equipment on automobiles.

Another object of the preesnt invention is to provide an improved mounting for either an opaque, translucent or transparent sun glare visor, with means adapting the same for universal movement in association with conventional opaque sun visors normally found as stock equipment on present day automobiles.

Another object of the present invention is to provide an improved auxiliary sun visor, either opaque, transparent or translucent, for mounting in conjunction with the conventional opaque sun visor in such a manner that normally such auxiliary sun visor is partially obscured by the conventional opaque sun visor; but the auxiliary sun visor may be moved to positions, using improved means, with its plane substantially parallel either to the plane of the front windshield or the side window of the automobile, and in general may be moved in any one of three directions with respect to the conventional sun visor with which it is associated.

Figure 1:
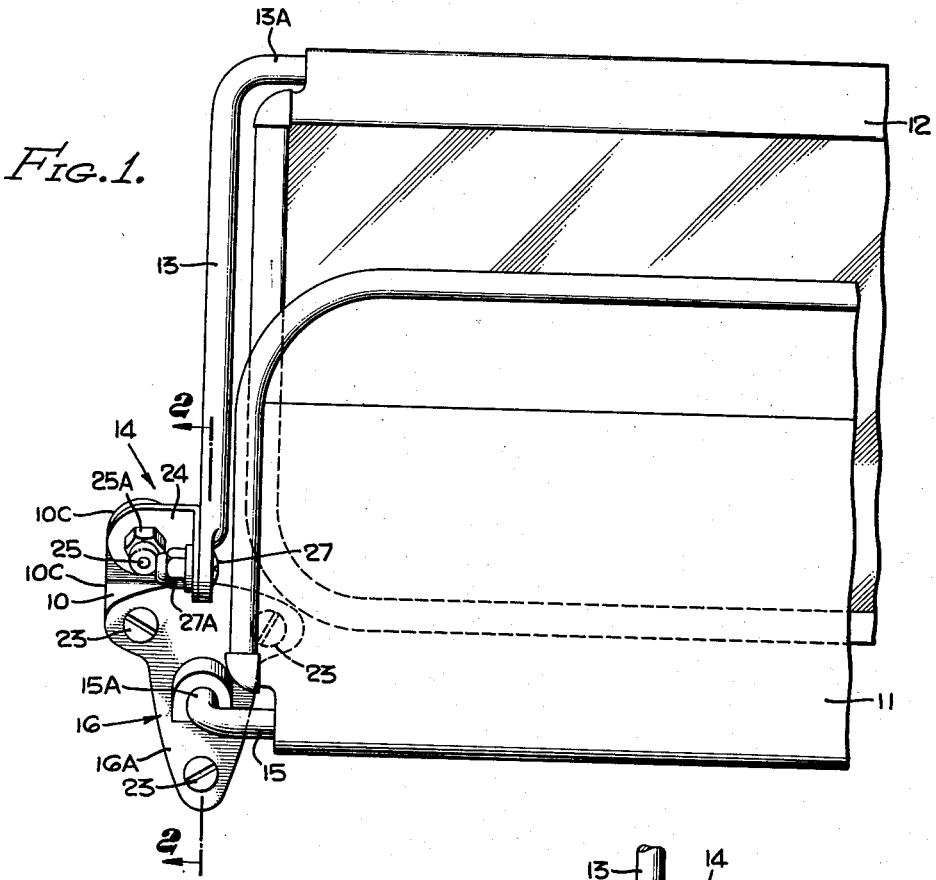
Figure 3:
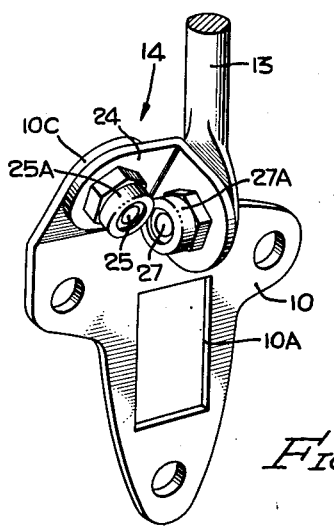
Figure 2:
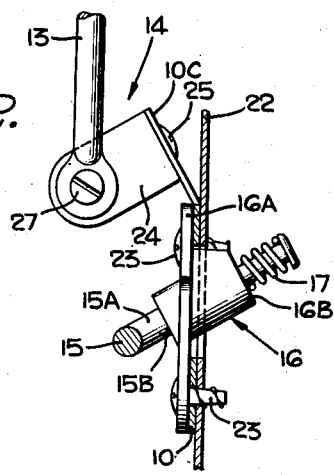

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1 is a view in front elevation of a conventional sun visor and an auxiliary sun visor in their normal positions when mounted above the windshield immediately in front of the driver's seat of an automobile, Figure 2 is a sectional view taken substantially on the line 2—2 of Figure 1, Figure 3 is a perspective view showing in greater detail the universal mounting connection for the auxiliary sun visor, and with the conventional sun visor omitted, and Figures 4-10, inclusive, show various relative positions the main and auxiliary sun visors may assume in their use.

Basically, the arrangement comprises a bracket member 10 on which are mounted the conventional sun visor 11 and auxiliary sun visor 12, the supporting means for the conventional visor 11 being of standard conventional construction but the auxiliary visor 12 has such dimensions and is mounted in a special manner, using the crank arm 13 and universal connection 14 to the bracket member 10 to obtain new and improved results, some of which are readily indicated by the positions which the visors may assume, as exemplified in Figures 4–10, inclusive.

Figure 4:
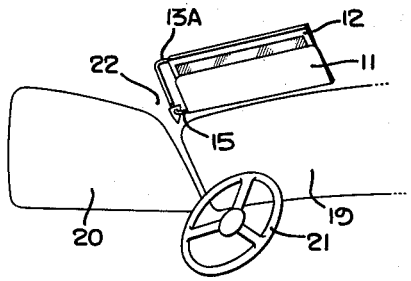

Specifically, the visor 11 is preferably opaque and is normally positioned, in a non-use position, as shown in Figures 1 and 4. The visor 11 itself is mounted on the rod 15 which passes through, in conventional manner, a longitudinally extending apertured portion near the edge of the visor 11, such apertured portion frictionally engaging the rod 15 whereby the visor 11 may be manually turned about the axis of the rod 15 to a plurality of adjusted positions wherein the frictional forces between the visor 11 and rod 15 serve to maintain the visor in such adjusted positions. The rod 15 has a right angle bent portion 15A which extends forwardly and upwardly (Figure 2) through an apertured portion of the stationary bearing block 16 mounted on the bracket 10. This bent portion 15A has mounted on its free end the coil compression spring 17, which is seated against a shoulder on one end of the shaft 15A with the other end of the spring 17 abutting the bearing block 16, so that an annular shoulder 15B (Figure 2) on the rod 15 frictionally engages the bearing block 16 whereby the rod 15 may be held in different adjusted angular positions.

Figure 5:
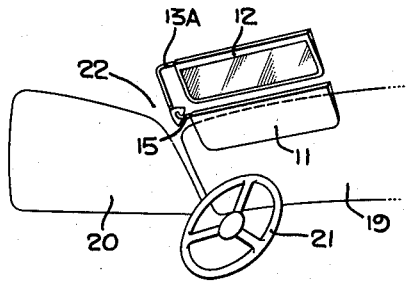
Figure 6:
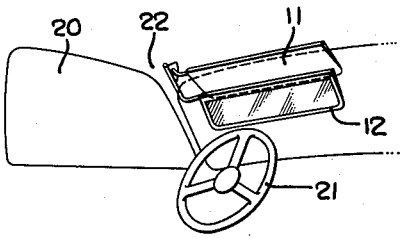
Figure 8:
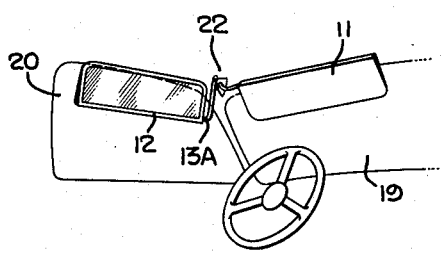
Figure 7:
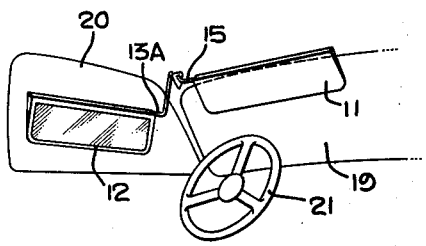
Figure 9:
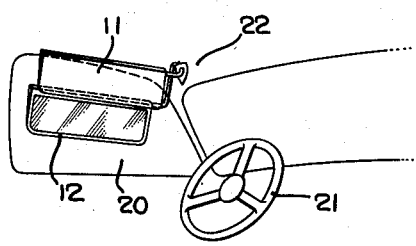
Figure 10:
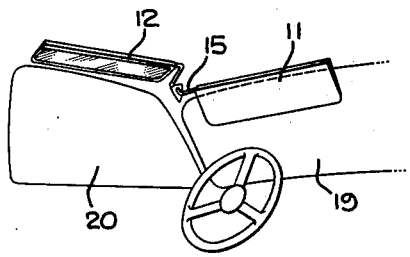

This structure for supporting the visor 11 thus allows the visor 11 to be either swung down from its normal retracted position shown in Figures 1 and 4, to a position in front of the windshield 19 as shown in Figure 5, or to positions adjacent the front side window 20 as shown in Figure 9.

It is noted that the bearing block 16 has a portion 16A which overlies generally the bracket 10. The bracket member 10 has a central rectangular shaped apertured portion 10A therein for receiving the bearing block 16. The bearing block flange 16A and bracket 10 are secured to the supporting member 22 on the automobile by means of three self-tapping screws 23 which pass through aligned apertures in the bracket 10 and bearing flange 16A and such supporting member 22.

As seen in Figures 1 and 2, the bracket 10 has an integrally formed ear 10C which extends generally upwardly and forwardly and frictionally supports right angle member 24 in different adjusted positions. The angle member 24 is mounted for rotative adjusted movement about the axis of the bolt 25, passing through aligned apertures in the ear 10C and one leg of angle member 24. In similar manner a bolt 27, passes through aligned apertures in the other leg of the angle member 24 and the lower end of the crank arm 13, to allow rotative movement of the crank arm 13 about the axis of the bolt 27. The nature of the connection between the angle member 24 and crank arm 13 is such that the arm 13 is maintained by friction in different adjusted positions. The frictional connection between the aforementioned angle member 24 and ear 10C is of the same nature so that the angle member 24 is likewise held by frictional forces in different adjusted positions. These two frictional connections are obtained by tightening the nuts 25A and 27A on bolts 25 and 27 only slightly, these nuts 25A, 27A being of, for example, the type with an elastic washer incorporated in the same to prevent loosening of the nuts in use of the shield 12.

The crank member 13 has an effective length comparable to the width of the visor 11, and comparable to the width of the visor 12 which it supports. The upper end of the crank member 13 is bent to provide a rod 13A which passes through an apertured portion of the visor 12 near its upper edge in Figure 1, the rod 13A being in frictional engagement with such apertured portion so that the visor 12 is held by friction in different adjusted positions.

The structures herein may be moved to the different adjusted positions shown in Figures 4 to 10, inclusive. In Figure 4 both shields 11 and 12 are in front retracted positions above the windshield 19 in front of the steering wheel 21 of the automobile. Figure 4 corresponds to Figure 1. To achieve the arrangement shown in Figure 5, the shield 11 is simply turned about the axis of the rod 15 to lower the shield 11 from its front retracted position shown in Figure 4 to its front extended position shown in Figure 5, this adjustment being accomplished without disturbing the position of shield 12. Then if it is desired to shield a greater part of the windshield, the shield 12 is swung from its front retracted position shown in Figure 5 to its front lower extended position shown in Figure 6, this movement being accomplished by rotation of the shield arm 13 about the axis of bolt 27 accompanied by a rotation of the shield 12 about rod 13A. Thereafter, if it is desired to shield the upper portion of the windshield 19 and the lower portion of the side window 22 immediately adjacent the driver's compartment, the shield 12 is swung from its front lower extended position shown in Figure 6 to its side lower extended position shown in Figure 7, this movement being permitted by the universal type of connection provided by the angle member 24 (Figure 1) and bolts 25, 27. Then, if it is desired to shield the upper portion of the side window 22, the shield 12 is moved about its supporting rod 13A from its side lower extended position shown in Figure 7 to its side upper extended position shown in Figure 8. It may be desired to shield both the upper and lower portions of the side window 22 and in such case the shields 11 and 12 are moved to their positions shown in Figure 9, wherein the shield 12 is in its side lower extended position and the shield 11 is in its side extended position. Also, as demonstrated in Figure 10, the shield 12 may be moved to a side retracted position if desired. Further, while the drawings do not show the shield 11 in a side retracted position similar to the position of the shield 12 in Figure 10, it is obvious that the shield 11 may be thus positioned.

Thus, it is apparent that the shield 12 may be adjusted to essentially six different positions, namely (1) a front retracted position shown in Figures 1 and 4; (2) a front lower extended position illustrated in Figure 6; (3) a front upper extended position not illustrated as such in the drawings but accomplished by moving the shield 12 about the axis of its supporting rod 13A from its position shown in Figure 6; (4) a side lower extended position illustrated in Figure 7; (5) a side upper extended position illustrated in Figure 8; and (6) a side retracted position illustrated in Figure 10. It is likewise apparent that the shield 12 may be adjusted to essentially four different positions which may be accomplished regardless of the position of shield 12, namely (1) a front retracted position shown in Figures 1 and 4; (2) a front extended position shown in Figure 5; (3) a side extended position shown in Figure 9; and, (4) a side retracted position which is not illustrated in the drawings as such.

It is apparent that either one of the two shields 11, 12 or both may be of opaque, transparent or translucent material, but preferably the visor 11 is opaque whereas the visor 12 is transparent glare reducing material.

Also, instead of using the universal type of connection between the bracket 10 and shield shown specifically herein, it is apparent that other forms of universal connections may be used; for example, conventional ball and socket connectors may be used having sufficient friction developed between the ball and socket portions to maintain the shield 12 in the adjusted positions shown herein.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A sun shield of the character described, comprising: a bracket comprising a substantially flat mounting plate adapted to have its flat face abutting and mounted on an inner wall of an automobile above the windshield, a first shield, a cantilever supported rod having one of its ends mounted for rotation about an axis perpendicular to its axis on said bracket, with said axis extending generally forwardly and upwardly with respect to the plane of said mounting plate, means pivotally supporting said first shield on said rod, a second shield, a second rod, a universal type of connection joining an end of said second rod to said bracket for universal movement thereon, means pivotally connecting said second shield on a first portion of said second rod, the width of said second shield being somewhat greater than the effective width of said first shield, said second rod having a crank arm portion thereof contiguous with said first portion upon which said second shield is mounted, said crank arm portion having a length comparable to the width of said second shield, and said crank portion being pivoted on said bracket about an axis which extends generally forwardly and upwardly and generally parallel with the first mentioned axis, said crank portion being intermediate said first portion and said end of said second rod.

2. In an arrangement of the character described, a bracket comprising a substantially flat mounting plate adapted to have its flat face abutting and mounted on an inner wall of an automobile above the windshield, a first arm, a first shield, one end of said arm being mounted for movement on said bracket about an axis which extends generally forwardly and upwardly with respect to the plane of said plate, and the other end of said arm supporting said first shield, for movement from a position in front of the windshield of an automobile to a position in proximity to the adjacent front side window of the automobile, a universal type of connection mounted on said bracket, a crank arm having one of its ends connected to said universal type of connection, the other end of said crank arm carrying a second shield, the effective length of said crank arm being comparable to the width of said second shield and comparable to the width of said first shield, said crank arm being pivoted on said bracket about an axis which extends generally forwardly and upwardly and generally parallel with the first mentioned axis.

3. In an arrangement of the character described, a bracket comprising a substantially flat mounting plate adapted to have its flat face abutting and mounted on an inner wall of an automobile above the windshield, a first arm, a first shield, one end of said arm being mounted on said bracket at a relatively low point thereon about an axis which extends generally forwardly and upwardly with respect to the plane of said plate, and the other end of said arm supporting said first shield, for movement from a position in front of the windshield of an automobile to a position in proximity to the adjacent front side window of the automobile, said bracket having an upwardly and forwardly extending ear, a right angle supporting member mounted for pivotal movement on said ear about an axis which extends generally forwardly and upwardly and generally parallel with the first mentioned axis, a crank arm pivotally connected to said right angle member, and a second shield mounted on the extremity of said crank arm.

4. In an arrangement of the character described, a bracket comprising a substantially flat mounting plate adapted to have its flat face abutting and mounted on an inner wall of an automobile above the windshield, a first arm, a first shield, one end of said arm being mounted for pivotal movement on said bracket about an axis which extends generally forwardly and upwardly with respect to the plane of said plate, and the other end of said arm supporting said first shield, for movement from a position in front of the windshield of an automobile to a position in proximity to the adjacent front side window of the automobile, a universal type of connection mounted on said bracket, a crank arm having one of its ends connected to said universal type of connection, the other end of said crank arm carrying a second shield to maintain the same either in a lower extended position or an upper extended position adjacent both the windshield and side window of the automobile to obscure upper and lower portions of said windshield and side window, said universal type of connection including means for pivoting said second shield about an axis which extends generally forwardly and upwardly and generally parallel with the first mentioned axis, said crank arm having an effective length comparable to the width of said second shield and comparable to the width of said first shield.

References Cited in the file of this patent

UNITED STATES PATENTS

| Number | Name | Date |
|---|---|---|
| 1,468,750 | Sechrist | Sept. 25, 1923 |
| 1,599,183 | Phillips | Sept. 7, 1926 |
| 1,988,511 | Rabbit | Jan. 22, 1935 |
| 2,223,845 | Davies | Dec. 3, 1940 |

FOREIGN PATENTS

| Number | Country | Date |
|---|---|---|
| 850,560 | France | Dec. 20, 1939 |